(No Model.)
W. A. WRIGHT.
Apparatus for Slicing or Cutting Maguey Plant.
No. 235,603. Patented Dec. 14, 1880.
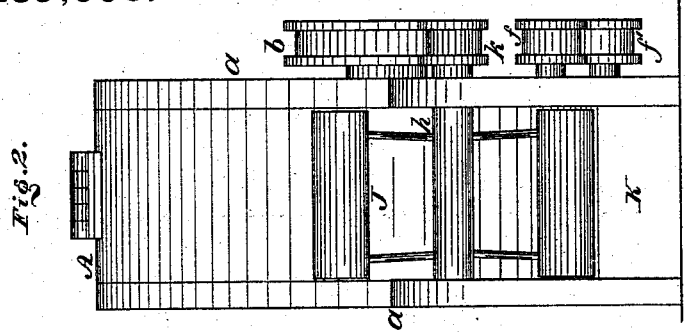
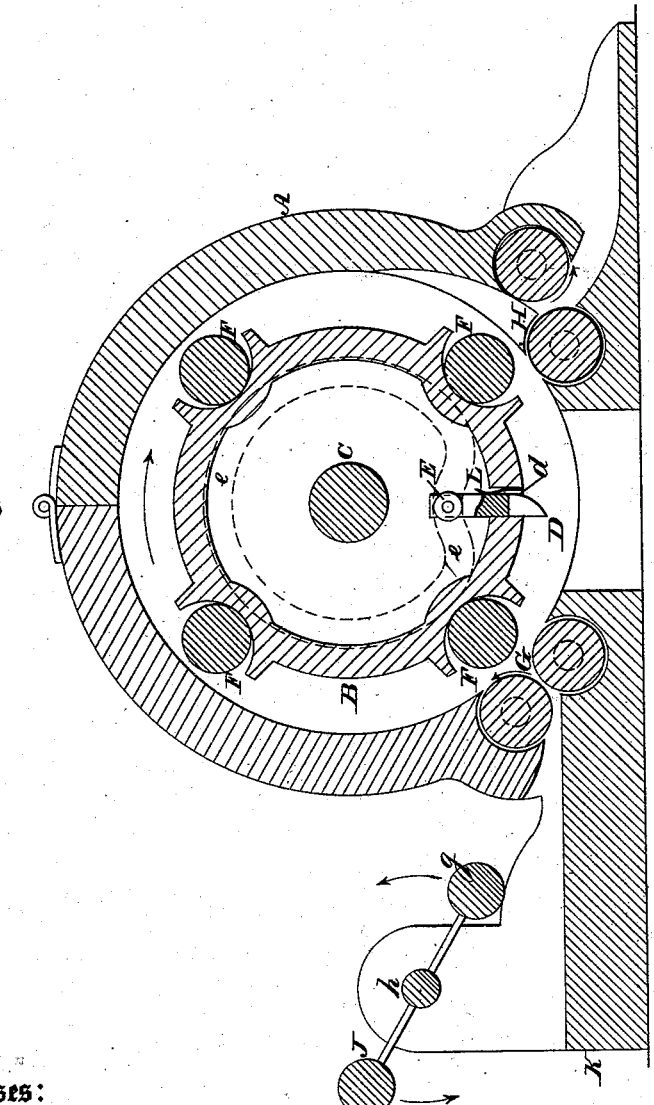
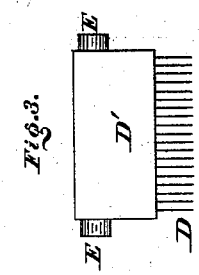
Witnesses:
A. P. Grant,
W. F. Kircher
Inventor:
Wm. A. Wright.
by John A. Wiederskein,
ATTORNEY.

ically.

UNITED STATES PATENT OFFICE.

WILLIAM A. WRIGHT, OF CENTRETON, NEW JERSEY, ASSIGNOR OF TWO-THIRDS TO JOSEPH B. DE YOUNG AND CHARLES Z. DE YOUNG, OF PHILADELPHIA, PENNSYLVANIA.

APPARATUS FOR SLICING OR CUTTING MAGUEY-PLANTS.

SPECIFICATION forming part of Letters Patent No. 235,603, dated December 14, 1880.

Application filed May 19, 1880. (No model.)

*To all whom it may concern:*

Be it known that I, WILLIAM A. WRIGHT, a citizen of the United States, residing at Centreton, in the county of Burlington and State of New Jersey, have invented a new and useful Improvement in Apparatus for Slicing or Cutting Maguey-Plant, which improvement is fully set forth in the following specification and accompanying drawings, in which—

Figure 1 is a vertical section of the apparatus embodying my invention. Fig. 2 is a front end view thereof. Fig. 3 is a view of the cutters detached.

Similar letters of reference indicate corresponding parts in the several figures.

My invention consists of a rotary beater for breaking down or flattening the plant prior to cutting.

It also consists of a rotary head carrying self-clearing cutters.

It also consists of the head having feeding, guiding, and discharging rollers.

It also consists in adapting the cutters to yield when subjected to strain.

Referring to the drawings, A represents a cylindrical casing, and B represents a rotary cylindrical head, which is located within the casing and has its shaft C mounted on the side walls, a, thereof, said shaft having connected to it a band-wheel, pulley, or gear-wheel, b, or other medium for transmitting power to the head B.

D represents a series of cutters, which are connected to a stock, D', from the sides of which project gudgeons E E. The stock D' and cutters D are fitted in an opening in the head B, and the gudgeons E enter cam-grooves e on the inner sides of the walls a of the casing A.

On the periphery of the head B are arranged rollers F, which may be journaled to said head or loosely fitted in pockets thereon; and to the bottom of the casing A, at opposite sides, are connected the feeding-rollers G G and discharging-rollers H, each pair whereof being geared together and receiving power in any suitable manner, band-wheels or pulleys *f f'* being employed in the present case.

At the front end of the apparatus is a beater or knocker, J, consisting of one or more heads, g, connected to a rotary shaft, h, which is mounted on the base or bed K of the apparatus, power being applied to said shaft h by means of a pulley, k, and belt or other suitable appliances.

The operation is as follows: The maguey-plant is passed along the base or bed K, under the beater J, which, revolving, breaks down or flattens the plant, the forward end of which is caught between the feeding-rollers G G and carried between the head B and casing A, and directed by the rollers F up around the casing, when it is reached by the cutters D and thereby cut or sliced into shreds or strips relatively to the spacing or adjustment of the cutters, the plant as cut then reaching the roller H, by which it is directed or discharged from the apparatus, the operations being repeated and continuous throughout the length of the plant. When the head B has made or about made its rotation the cam-grooves e withdraw or force the cutters into the head B, so as to clear the discharging-rollers and feeding-rollers or strip the cutters of pieces of the plant, after which said cam-grooves promptly move out the cutters to operative position for acting on the length of plant within the casing. Fragments of the plant, dirt, &c., escape through an opening at the base of the apparatus.

The opening *e* for the cutters D is enlarged in the direction of rotation of the head B, in order to permit certain play of the cutters or cutter-stock, said cutters, however, being held to their work by a spring, L, which is secured to the head B and bears against the back of the stock D'.

Should there be unusual strain on the cutters the power of the spring L is overcome, and the cutter-stock yields and is thereby relieved.

During the rotation of the head B the rollers F guide the plant around between said head and the casing, and prevent adhesion of the shreds to the head. If desired, more than one series of cutters may be applied to the head B.

Having thus described my invention, what I claim as new, and desire to secure by Letters Patent, is—

1. The rotary beater J in advance of the cutters, substantially as and for the purpose set forth.

2. The head B, rotating within the casing A, and provided with the self-clearing cutters D, substantially as and for the purpose set forth.

3. The head B, with cutters D and peripheral rollers F, in combination with the casing A, substantially as and for the purpose set forth.

4. The casing A, with feeding-rollers G and discharging-rollers H, in combination with the cutter-head B, having guiding-rollers F, substantially as and for the purpose set forth.

5. The head B, in combination with the cutters D, having bearing-springs L, substantially as and for the purpose set forth.

WM. A. WRIGHT.

Witnesses:
JOHN A. WIEDERSHEIM,
W. F. KIRCHER.